United States Patent
Held et al.

(10) Patent No.: US 8,131,748 B2
(45) Date of Patent: Mar. 6, 2012

(54) SEARCH QUERY FORMULATION

(75) Inventors: Theo Held, Wiesloch (DE); Martin Schrepp, Hockenheim (DE)

(73) Assignee: SAP AG, Walldorf (DE)

( * ) Notice: Subject to any disclaimer, the term of this patent is extended or adjusted under 35 U.S.C. 154(b) by 155 days.

(21) Appl. No.: 11/618,562

(22) Filed: Dec. 29, 2006

(65) Prior Publication Data

US 2007/0266017 A1 Nov. 15, 2007

Related U.S. Application Data

(60) Provisional application No. 60/800,151, filed on May 12, 2006.

(51) Int. Cl.
  *G06F 7/00* (2006.01)
  *G06F 17/30* (2006.01)

(52) U.S. Cl. ........................................ 707/769; 707/802

(58) Field of Classification Search .................. 707/1–4, 707/769, 802
  See application file for complete search history.

(56) References Cited

U.S. PATENT DOCUMENTS

| | | | | |
|---|---|---|---|---|
| 2002/0059297 | A1* | 5/2002 | Schirmer et al. | 707/104.1 |
| 2004/0085362 | A1* | 5/2004 | Sauermann et al. | 345/777 |
| 2004/0215612 | A1* | 10/2004 | Brody | 707/3 |
| 2005/0075996 | A1* | 4/2005 | Dettinger et al. | 707/1 |
| 2006/0116999 | A1* | 6/2006 | Dettinger et al. | 707/4 |
| 2007/0030282 | A1* | 2/2007 | Cash et al. | 345/581 |
| 2007/0143347 | A1* | 6/2007 | McGee | 707/104.1 |

OTHER PUBLICATIONS

Screen shot of a computer system interface from Microsoft corporation that is believed to have been available for sale at least one year prior to applicants' filing date.
Screen shot of a computer system interface from Apple corporation that is believed to have been available for sale at least one year prior to applicants' filing date.

* cited by examiner

*Primary Examiner* — Apu Mofiz
*Assistant Examiner* — Mohammad Rahman
(74) *Attorney, Agent, or Firm* — Fish & Richardson P.C.

(57) ABSTRACT

In a computing system, an input that a user makes under guidance of a graphical user interface may be received. The input specifies several query portions to be used in searching a data repository in the system. Each of the query portions comprises a value entered by the user that is associated with any of several attributes of objects in the repository. The input does not specify a logical operator between any of the query portions. A search query is generated for searching the repository by: (i) determining whether any of the query portions have a common attribute, and associating any such query portions with each other into a new query portion using a logical OR operator; and (ii) thereafter associating any of the query portions that were not associated in step (i), and any new query portion formed in step (i), with each other using a logical AND operator.

18 Claims, 9 Drawing Sheets

| | Home | | Help Log Off |
|---|---|---|---|
| | Calendar >> | Search Criteria | Saved Searches ▼ [Go] [Edit] |
| | Marketing >> | | |
| | Accounts >> | Occupation ▼ is ▼ Programmer [+] ~667 | _662 |
| | Products >> | | ~670 |
| | Activities >> | Qualification ▼ is ▼ ⬚ [+] [−] | |
| | Search [Go] | 669⌒ C++ Programming with Proficiency High ⟩665 | |
| | Create: | 672⌒ Java Programming with Proficiency Medium ⟩682 | |
| | ▶ Appointment | [Search] [Clear] Number of Results ⬚ Save Search As ⬚ | 668 |
| | ▶ Email | | |
| | ▶ Task | Value Help | |
| | ▶ Contact | | |

| Qualification ⌐673 | | | | [X]_676 | 683 |
|---|---|---|---|---|---|
| Language 674 | | Proficiency 675 | | Efficiency 676 | |
| Basic | | Superb | | Superb | |
| C 677 | | High 678 | | High | |
| C++ | | Medium 681 | | Medium | |
| Java 680 | | Adequate | | Adequate | |
| ABAP | | | | | 671 |
| | | | | | 664 |

SEARCH QUERY FORMULATION

CROSS-REFERENCE TO RELATED APPLICATIONS

This application claims priority from U.S. Provisional Application No. 60/800,151, filed May 12, 2006, and entitled "Dynamic Search Pattern for Specifying OR Connections and Intervals as Search Restrictions," the entire contents of which are incorporated herein by reference.

TECHNICAL FIELD

This document relates to search query formulation for searching in an electronic computing system.

BACKGROUND

Electronic storage of business information has become ubiquitous in today's business environment. Advances in electronic storage technology have made feasible the storage of vast amounts of electronic information as ever-larger storage capacity devices are introduced. In particular, as electronic storage densities increase and the cost of electronic storage decreases, businesses are eagerly adopting comprehensive electronic storage procedures for storing their business information. Additionally, the proliferation and widespread acceptance of electronic business transactions and communications has fueled significant demand for voluminous electronic storage capacity. Typically, businesses will store electronic information in electronic storage devices, often referred to as data repositories or data stores. Databases of electronic information may be maintained in the data repositories, and the information may be organized as a series of objects, each object including one or more attributes that may take values.

To effectively use electronic storage systems, users may frequently need to search for objects, attributes, or electronic information within the database. In one search interface, a user may be presented a search entry field, and may enter search terms and Boolean operators. For example, the user may enter "tennis AND racquet" in a search field to request a database search for objects that include a field with value "tennis" and a field with value "racquet." In this case, the user explicitly entered the logical "AND" Boolean operator to indicate that results including "tennis" and "racquet" entries were desired. As another example, a user may enter "(tennis AND racquet) OR football" in a search field to request a database search for objects that include a field with value "tennis" and a field with value "racquet," as well as for objects that include a field with value "football." Here, in addition to entering logical operators (AND, OR), the user has entered grouping elements—the parentheses—to specify a desired ordering of input criteria. However, some users may not be skilled in the intricacies of Boolean logic and may be uncomfortable entering search criteria that includes Boolean operators. Similarly, users may not be comfortable entering grouping elements with search criteria, especially as search request complexity increases.

In another example of a search interface, a user is presented with several search fields where input search terms may be entered. The user is simultaneously presented with a selection box labeled "Find links that match," and having two selection box choices: "ANY," and "ALL." If the user selects the "ANY" option, the search will identify objects having any of the entered search terms—so long as an object has at least one of the entered terms, it will be identified. If the user alternatively selects the "ALL" option, the search will only identify objects having all of the entered search terms. Users of this search interface must make an additional choice and take an additional action in addition to entering search values. Also, search complexity is limited, as only two such choices are possible.

SUMMARY

This document relates to search query formulation for searching in an electronic computing system.

In a first general aspect, a method includes receiving an input that a user makes under guidance of a graphical user interface, where the input specifies several query portions to be used in searching a data repository in an enterprise resource computing system. Each of the query portions comprises a value entered by the user that is associated with any of several attributes of objects in the data repository. The input does not specify a logical operator between any of the query portions. A search query is generated for searching the data repository by: (i) determining whether any of the query portions have a common attribute, and associating any such query portions having the common attribute with each other into a new query portion using a logical OR operator; and (ii) thereafter associating any of the query portions that were not associated in step (i), and any new query portion formed in step (i), with each other using a logical AND operator. The data repository is searched with the generated search query and results thereof are presented.

In selected embodiments, each of the several query portions and the corresponding associated attribute individually comprise a single search statement, and each search statement may be displayed on a single line in the graphical user interface. The graphical user interface may not display the logical OR operator, may not display the logical AND operator, and may not provide for user selection of logical operators.

In selected embodiments, the search query may be generated using at least one logical OR operator and at least one logical AND operator. The query portions having a common attribute may be logically isolated with grouping elements to form the new query portion, and the graphical user interface may not display the grouping elements for operating on received query portions.

In selected embodiments, a query portion that specifies a range of values may be received, where the range comprises a lower range limit and an upper range limit, and where the query portion and its associated attribute comprise a single search statement that is displayed on a single line in the graphical user interface. The search query may be generated using at least two query portions that each specify a range of values, where the at least two query portions having a common attribute and are associated using a logical OR operator. At least one of the query portions may comprise at least two values entered by the user, where each of the at least two values is associated with distinct attributes of objects in the data repository, and where the at least two values and associated attributes comprise a single search statement that is displayed on a single line in the graphical user interface.

In a second general aspect, a graphical user interface for obtaining a query for searching a data repository comprises at least three search statements capable of receiving user input. The user input comprises query portions to be used in searching a data repository in an enterprise resource computing system, and each of the query portions comprises a value entered by the user that is associated with any of several attributes of objects in the data repository. The input does not specify a logical operator between any of the query portions.

A search query for searching the data repository may be generated by: (i) determining whether any of the query portions have a common attribute, and associating any such query portions having the common attribute with each other into a new query portion using a logical OR operator; and (ii) thereafter associating any of the query portions that were not associated in step (i), and any new query portion formed in step (i), with each other using a logical AND operator. The search query is generated by associating at least two query portions with a logical OR operator and by associating at least two query portions with a logical AND operator.

Advantages of the systems and techniques described herein may include any or all of the following: Providing a more user-friendly search experience; providing a more intuitive search criteria input experience; providing a less restrictive search experience; improving search query formulation; relieving a user of detailed Boolean logic comprehension responsibility; providing a convenient method of searching over ranges; and providing a search interface that requires less user interface display area.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 4 is a screen shot of an exemplary user interface that can be used for searching over a range of values in a single search statement.

FIG. 5 is a screen shot of an exemplary user interface that can be used for searching over multiple ranges of values.

FIG. 6 is a screen shot of an exemplary user interface that can be used for searching with combined search attributes.

FIG. 7 is a screen shot of an exemplary user interface that can be used for searching with a combined search statement.

Like reference symbols in the various drawings indicate like elements.

DETAILED DESCRIPTION

Figure 1:
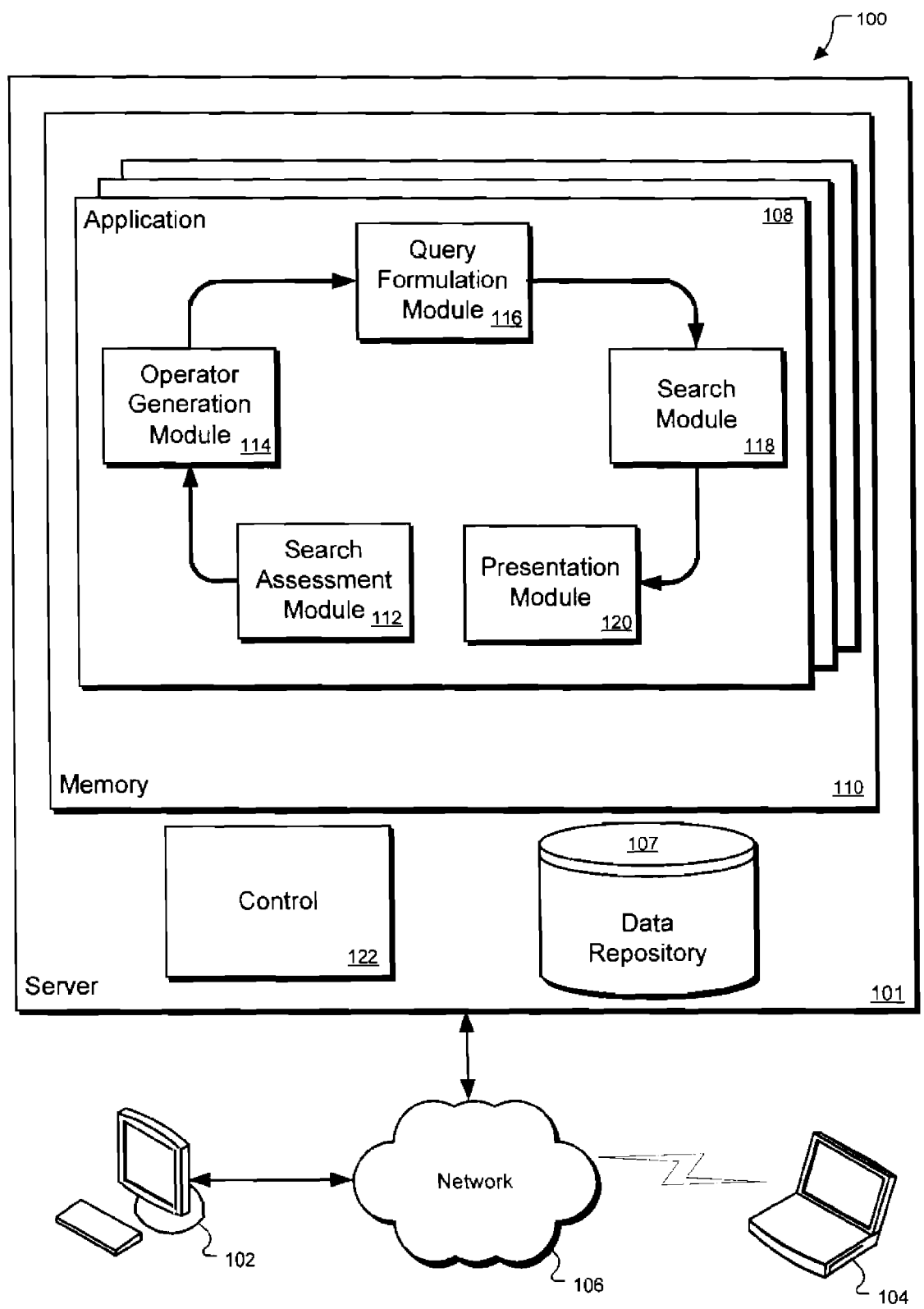
FIG. 1 is a block diagram of an exemplary architecture that can be used to obtain a query for searching a data repository in an enterprise resource computing system.

FIG. 1 is a block diagram of an exemplary architecture that can be used in an enterprise resource computing system to obtain a query for searching a data repository. Using the architecture shown in FIG. 1, a user may enter input search criteria pertaining to a desired database search, and the architecture may assess the input criteria and automatically include appropriate logical operators and grouping operators with the input search criteria to formulate a database search query. In an implementation, the entered input search criteria do not include any logical operators that operate on the search criteria, nor any grouping operators or elements that operate on the search criteria or logical operators. The input search criteria may be as complex or as simple as desired, and may include repeated criteria instances directed to different search aspects. For example, the search criteria may include multiple instances of the same attribute, where the entered search criteria specifies a different attribute value for each instance of the same attribute. The architecture may automatically generate and incorporate appropriate logical operators with the search criteria to form a database search query, and this may occur in a transparent manner from the perspective of a system user. Similarly, grouping operators or elements may be automatically generated and incorporated with the logical operators and search criteria in formation of the database search query. In this fashion, the user may be spared the responsibility of understanding and entering such logical operators and grouping operators, while still realizing a powerful and effective search query formulation, database search, and search results presentation, which may facilitate a user-friendly and enjoyable search experience. An enterprise resource computing system refers to one or more software applications or software components used to execute a plurality of business processes in an organization (e.g., businesses, non-profit organizations, non-governmental organizations and governments). As one skilled in the art will appreciate, typical enterprise resource computing systems include functions for performing at least one of enterprise resource planning (ERP), customer relationship management (CRM), supply chain management (SCM), human capital management (HCM), and supplier relationship management (SRM) processes.

In general, a user may input search criteria into a graphical user interface having search capabilities on a server device 101 included in the architecture 100. The architecture 100 may construct a query to generate search results for presentation in one or more client devices 102, 104 over a network 106. In some implementations, the user may enter or select one or more attributes in the user interface to obtain search results. An attribute may be, for example, an account name, a postal code, an employee name, a country, a qualification, an identification number, or various other business entities that may be found in an enterprise resource computing system. Attributes are generally related to one or more business objects included in a data repository 107. Business objects may represent a specific view on some well-defined business content, and may include attributes and associated values. Examples of business objects that can be stored in the data repository 107 include accounts, products, activities, sales orders, service orders, leads, opportunities, contact persons, campaigns, target groups, and marketing plans. The business object list above is not all-inclusive and, as such, other business objects and content may be present in the data repository 107. In some implementations, the data repository 107 may be included in the server 101. In other implementations, the repository 107 may be external to the server 101. In yet other implementations, one or more searchable data repositories may be included in the server 101.

The architecture 100 includes various applications, such as an enterprise resource software application 108, that are generically shown residing in memory 110. As is conventional, the applications may be stored in a nonvolatile storage location, such as the repository 107 or another repository, including a data store exterior to the server 101, and may be transferred to memory 110 for active use by the architecture 100. The enterprise resource software application 108 may be included in architecture 100 to manage and schedule system resources, such as personnel, events, customer issues, repairs, and equipment. The application 108 includes several modules capable of assessing input search criteria, generating and configuring search operators, formulating queries using input search criteria and generated operators, performing database searches, and presenting search results in the system. The modules include: a search assessment module 112, an operator generation module 114, a query formulation module 116, a search module 118, and a presentation module 120.

The architecture 100 may use the search assessment module 112 to analyze search statements. Search statements may include input search criteria as well as search information initially presented to a user, in which initial information may have been previously configured, for example, during the system installation. This analysis may include determining which, if any, of the search statements, or query portions, share common attributes, and categorizing those search statements having common attributes into groups. In some examples, there may be one, two, three, or more groups of search statements, where each search statement in a particular group includes a common attribute.

In forming a search query for searching a database, logical operators may be used to specify a defined relationship among the search statements. The architecture 100 may use the operator generation module 114 to seamlessly generate logical operators and include them automatically, without requiring user input involving logical operators, and without providing user notice that such logical operator incorporation is occurring.

Examples of logical operators that may be generated include a logical AND operator, a logical OR operator, a logical EXCLUSIVE OR operator, a NEGATION operator, or any other type of Boolean operator. Additionally, logical grouping elements may be used to organize and assign relationships among the search statements and the logical operators. The architecture 100 may further use the operator generation module 114 to seamlessly generate logical grouping elements and include them automatically without requiring user input. Examples of logical grouping elements include parentheses, brackets, braces, etc., including elements of any appropriate complexity for nesting search statements, groups of search statements, operators, or combinations thereof.

While a search query may be formulated by combining search statements and generated logical operators and grouping elements, search statements themselves may also be formulated. For example, when the search assessment module 112 completes an analysis of a particular search statement, the architecture 100 may use the query formulation module 116 to formulate one or more search statements. A search statement may include an attribute, a search associator, and one or more fields of input search criteria, some or all of which can be used to formulate the search statement. For example, some search statements may be formulated to include an attribute and a search associator, such as when the search associator is defined as "is empty." In this example, the search query may be performed to locate business information having an attribute that has an empty field. Thus, the search requester need not include further input search criteria to formulate the search statement. In general, the search associator may define a relationship between the attribute, which may be entered or preselected, and an associated input search criterion. For example, a search statement may include the attribute "last name," the search associator "IS," and the search criterion "Smith," where a user wishes to search for all business objects having the last name of "Smith." The query formulation module 116 may combine the three entities and create the search statement used to perform the search query. In some implementations, additional search criteria may be added by the query formulation module 116, for example, by adding similar spellings of "Smith," such as lowercase and uppercase versions of the entered criterion.

After formulating the search query, the architecture 100 may use the search module 118 to perform a search using the formulated search query. In general, the search may be performed on one or more data repositories, but may be narrowed to a select few data repositories by the user, or by a function in the architecture 100. For example, the search query may trigger a search of a specific database based on the selected attribute or entered criteria. In some implementations, searches may be performed on all available data repositories. Also, in some implementations, the search query may not specify the database to be searched.

Search results may be returned to the user in various ways. In one implementation, the search results may be presented in list form in the requesting application 108. In another implementation, the search results may be emailed to the user. In yet another implementation, the results may be stored in a repository 107 for later access, whether by a user or by a software application. The architecture 100 may use the presentation module 120 to present the search results in the application 108. The presentation module 120 may organize search results for display, storage, or emailing. The search results may include links, objects, text, images, help content, and other search content that may or may not be selectable by the user. The search results may also be modifiable by the user, as will be discussed in more detail below.

The search results may be displayed on a display or monitor of the client device 102. For example, the monitor may display the search results above, beneath or beside the entered search statement in the application 108. In some implementations, the search results may be displayed in a separate application, such as a word processing application, web browser, or other system application. In addition to or in lieu of being displayed, the search results may be stored, and in some implementations, may be used as input to another application in the system 100. In some implementations, the search results may be sent to a laptop, personal digital assistant (PDA) or other system device that may have requested the original search, or simply requested a copy of the search results. In some implementations, the search results may be emailed to a group of individuals.

The architecture 100 includes or is communicably coupled with the server 101, the one or more client systems 102, 104, and control devices 122, at least some of which can communicate across network 106. The server 101 generally hosts application software for receiving user input to perform a search query. The server 101 comprises an electronic computing device operable to receive, transmit, process and store data associated with the architecture 100. Although FIG. 1 illustrates a single server 101 that may be used with the disclosure, the architecture 100 may be implemented using one or more computers other than servers, as well as a server pool. The server 101 may be any computer or processing device, such as, a blade server, general-purpose personal computer (PC), Macintosh, workstation, Unix-based computer, or any other suitable device. According to one implementation, the server 101 may also include or be communicably coupled with a web server and/or a mail server.

The server 101 may include local electronic storage capacity, such as data repository 107. The data repository 107 may include any memory or database module and may take the form of volatile or non-volatile memory including, without limitation, magnetic media, optical media, random access memory (RAM), read-only memory (ROM), removable media, or any other suitable local or remote memory component. The illustrated data repository 107 may store system data such as search results, virtual private network (VPN) applications or services, firewall policies, a security or access log, print or other reporting files, HTML files or templates, data classes or object interfaces, unillustrated software applications or sub-systems, and others.

The server 101 also includes control devices 122. The control devices 122 may include one or more processors to execute instructions and manipulate data for performing the operations of the server 101. The control devices 122 may include, for example, a central processing unit (CPU), a blade, an application specific integrated circuit (ASIC), a field-programmable gate array (FPGA), or other suitable hardware or software control system. In the illustrated implementation, the control devices 122 execute instructions that comprise the application 108.

The network 106 may facilitate wireless or wireline communication between the server 101 and any other local or remote computers, such as clients 102 and 104. The network 106 may be all or a portion of an enterprise or secured network. In another example, the network 106 may be a VPN between the server 101 and the client 102 across a wireline or a wireless link. While illustrated as a single or continuous network, the network 106 may be logically divided into various sub-nets or virtual networks without departing from the scope of this disclosure, so long as at least a portion of the network 106 may facilitate communications between the server 101 and at least one client (e.g., client 102). In certain implementations, the network 106 may be a secure network associated with the enterprise and certain local or remote clients 102 or 104. The network 106 may be the Internet, or a portion thereof.

The client 102 may be any computing device operable to connect or communicate with the server 101 or the network 106 using any communication link. At a high level, each client 102 may include or execute at least one hosted application graphical user interface. There may be any number of clients 102 communicably coupled to the server 101. As used in this disclosure, the client 102 is intended to encompass a personal computer, touch screen terminal, workstation, network computer, kiosk, wireless data port, smart phone, PDA, one or more processors within these or other devices, or any other suitable processing device. For example, the client 102 may be a PDA operable to wirelessly connect with an external or unsecured network.

The application 108 may be generally capable of assessing input search criteria, generating and associating logical operators, formulating queries using input search criteria and generated operators, performing database searches, and presenting search results in the system. In one implementation, the users of the application 108 may include sales personnel, customer service personnel, field applications personnel, repair or installation personnel, or any other user of business information. The following exemplary descriptions of screen shots focus on the operation of the application 108, or one or more of its components or sub-modules, in performing one of the exemplary methods or processes. However, the architecture 100 can use any appropriate combination and arrangement of logical elements implementing some or all of the described functionality.

Figure 2:
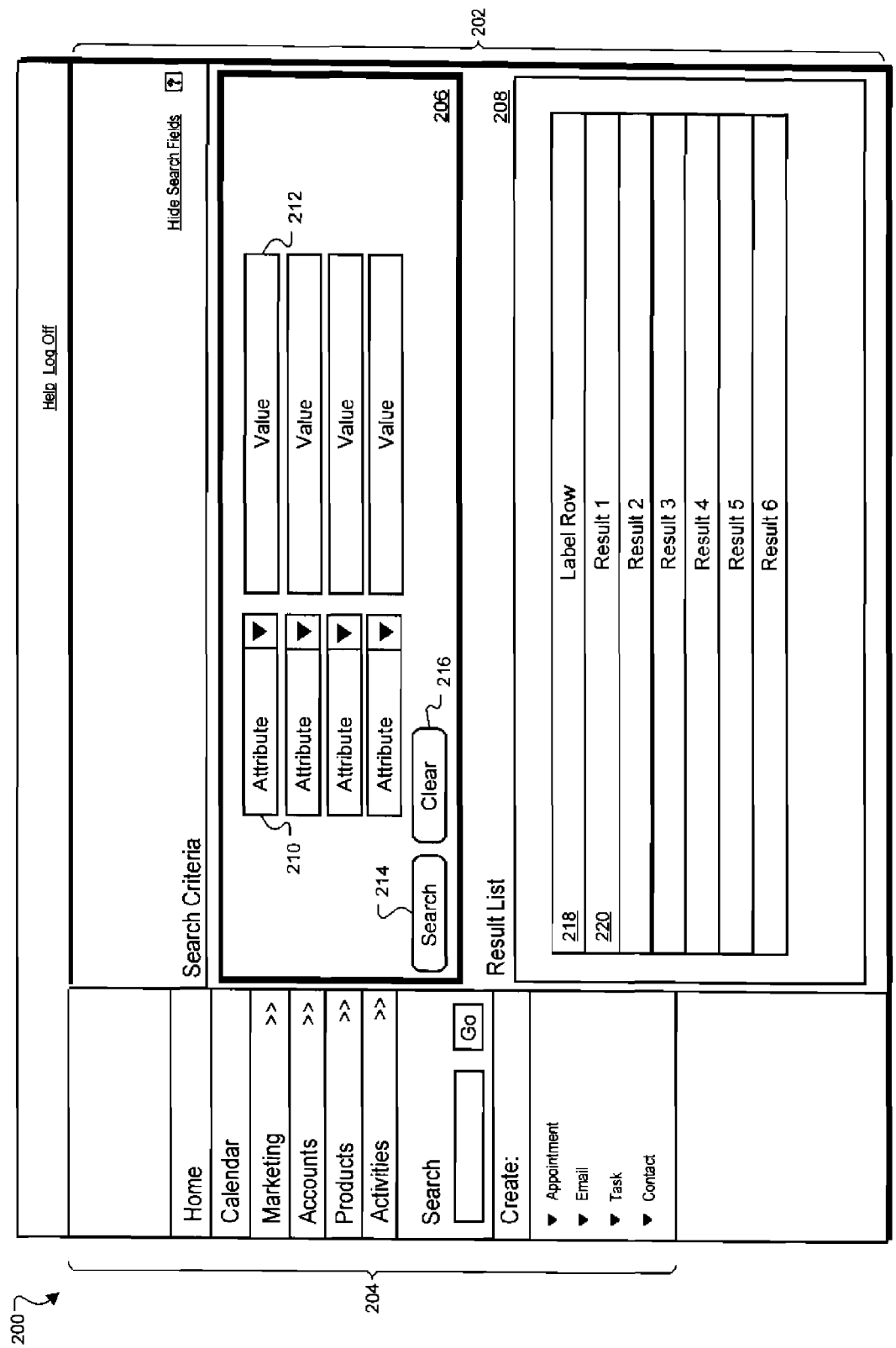
FIGS. 2-3 are screen shots of exemplary user interfaces that can be used for receiving user input associated with a search in the computing system of FIG. 1.

FIG. 2 is a screen shot of an exemplary user interface 200 that can be used for receiving user input associated with a search in the computing system of FIG. 1. The user interface 200 includes a work area 202 for displaying screens that a user selects, a sidebar menu 204 for navigating the software architecture, a search area 206 for entering search criteria and a result display area 208 for presenting search results of a database search. FIG. 2 is exemplary, and any number of display areas may be presented, and these display areas may be located at any appropriate place within the user interface.

In this example, the work area 202 includes the search area 206 and the result display area 208. Both the search area 206 and the result display area 208 may be minimized or maximized to provide an interface that is easily readable. This may provide advantages because a user of the system 200 may wish to view more search results than search criteria, or vice versa, and can modify the screen accordingly. The search area 206 includes one or more search statements for entering search information. In an implementation each search statement may be displayed on a single line of the search area 206. This may provide an intuitive interface, as a user may recognize and understand that a search statement, regardless of complexity, may be contained within a single line of the search area 206, which may help prevent confusion and may minimize search entry errors, which may lead to better search results. Additionally, the user may prefer to view search statements that occupy a single line, as it may be easier to interpret a search statement confined to a single line of the search area 206. Moreover, on-screen search area display space may be conserved, which may permit expansion of other display areas, such as permitting additional search results to be displayed, for example.

One or more search statements may be used to generate a search query. The example in FIG. 2 shows four search statements, each occupying a line in the search area 206, with each search statement having two fields for receiving input. Here, the first field 210 is an attribute field having a drop down control that permits a user to select among various attributes. The dropdown may contain labels of fields that can be used to formulate search restrictions for a particular business object, according to one implementation. Recall from above that attributes may be associated with business objects in the data repository 107. Thus, the attribute selected in a search statement may correspond to one type of data field. Attributes may correspond to various data fields (e.g., a text field, a numeric field, a date field, etc.). For example, when the user is searching for an account, the first attribute field 210 may be populated with "Name," since it may be logical to search for an account using the name of the account. Here, the system may be configured to search on text, rather than symbols or numbers, since names are typically text entries.

The second field 212 includes a corresponding value field for a particular attribute field. Users may input various data into the value field 212 to search for business object data associated with the selected attribute. In effect, the value field 212 may be used to enter a search restriction on the associated attribute. In the example of FIG. 2, a user may enter a value in the value field 212 that can be used in a search to restrict the attribute 210 when searching for objects having the selected attribute and value. The layout of the value field 212 may depend on the selected attribute. In the example shown in FIG. 2, the value field 212 is currently an empty text entry box. In some implementations, the value field may be a selectable file control, value help (value list or complex search help), or a dropdown control, to name a few examples.

The search area 206 also includes a control 214 for initiating a search query in the system. The search control 214 may initiate one or more search queries when selected. Alternatively, the user may select the enter key on a keyboard to initiate a search query. Once the search is underway, results may appear in the result display area 208 as they are available. For example, results may appear in the result display area 208 a few at a time until the search is complete, or may appear together following completion of the search. The result display area 208 may display various results depending on user entered input. For example, when the user is searching for accounts, several fields may appear pertaining to search-identified accounts. The fields may be presented in a label row 218, and may include labels such as ID number, country, and company name, etc., to identify the particular field. In FIG. 2, the results may be displayed in one or more result rows 220, located under the label row 218 in this example, according to the label. The results may be selectable and may include information, links, objects, or help content. In addition, the user may select several results at one time for copying or dragging into another application, for example. The result display area 208 may also return zero results when nothing is found after execution of a search query. In some implementations, the result display area 208 may be personalized, or user configurable, according to the labels, number of results viewable, or number of results received at one time, to name a few examples.

The search area 206 also includes a control 216 for clearing search entries in the system. The clear control 216 may clear all search fields, as well as the search result list, but may not typically reset the search statement itself. In another implementation, the clear control 216 may clear only selected fields. In one implementation, the number of search statements remains the same following a selection of the clear control 216, and the selected attributes.

Figure 3:
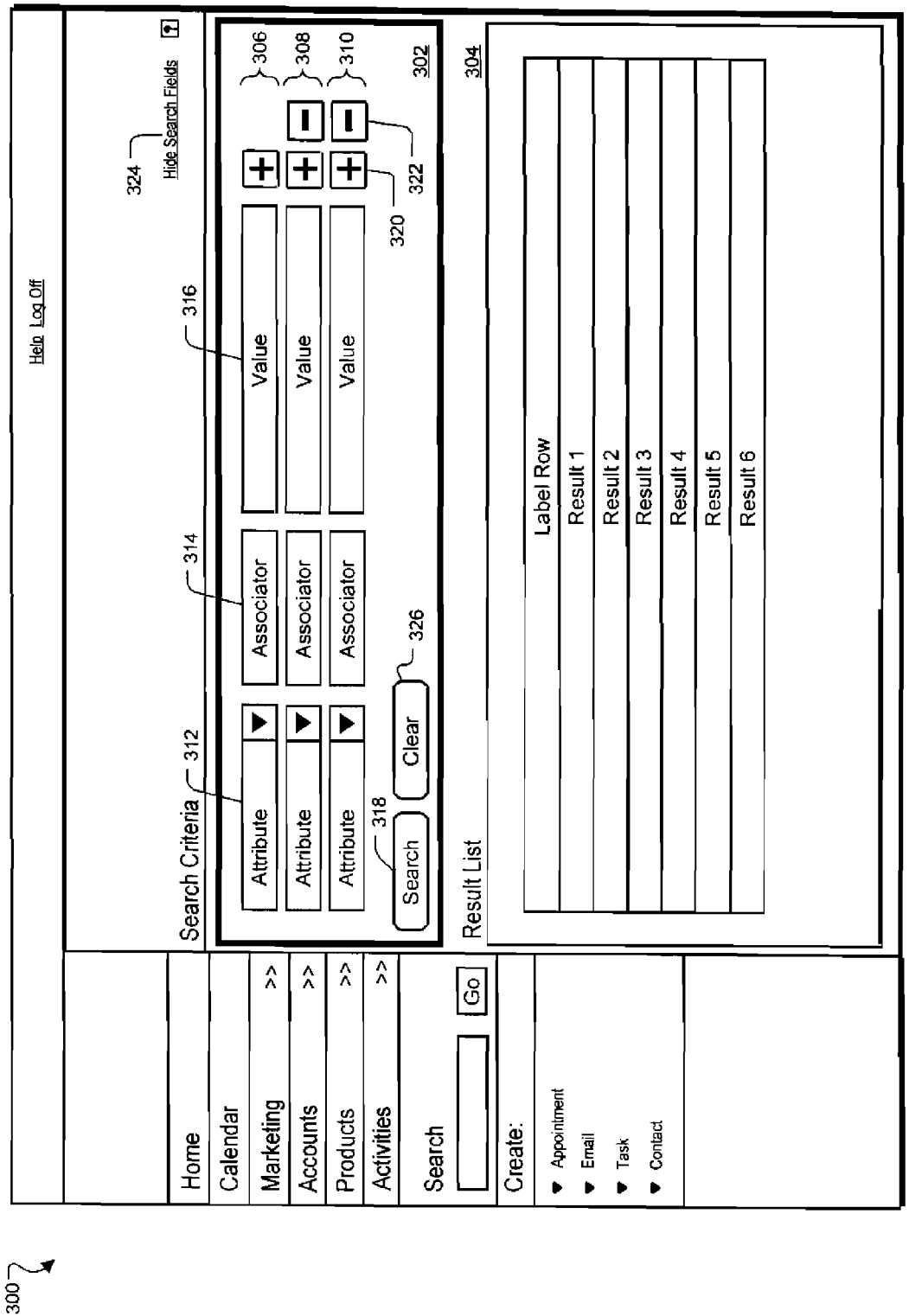

FIG. 3 is a screen shot depicting another example of a user interface 300 that can be used for receiving user input to perform a search query, for example, in the computing system of FIG. 1. Similar to FIG. 2 above, the user interface 300 includes a search area 302 for entering search criteria and a result display area 304 for displaying search results. In this example, the search area 302 includes three search statements 306, 308, and 310, each occupying a single line of the search area 302. In the example of FIG. 3, each search statement includes an attribute field 312, an associator field 314, and a value field 316. In general, the attribute field 312 may be linked to the value field 316 by the associator field 314 to create a specific relation between the two. Thus, the created link may provide the system 100 with a search statement that may limit returned search results in a desirable way. The fields shown in FIG. 3 are exemplary and there may be additional or fewer fields in a single search statement. After the search statements are set, whether entered by a user or configured by the system or some combination thereof, the user may select a search button 318. The system may then analyze the search statements and generate appropriate logical operators and grouping elements, and may formulate a search query for searching a database. Search results may be obtained and presented in the result display area 304, where the user may view, store, send, or otherwise operate on the result content.

As stated above, the attribute field 312 may be a selectable control, such as a dropdown box where a user can select attributes. Attributes may include text, such as names, countries, or businesses; numbers, such as identification numbers, account numbers, postal codes, or phone numbers; or may include user configurable entities. Examples of additional attributes may include skill set, employee name or number, salary, revenue, and various other business entities that may be found in an enterprise resource computing system. The associator field 314 may be a dropdown box containing suitable operators with respect to a previously selected attribute. For example, the associator field 314 may include operators such as "IS," "IS NOT," "IS EMPTY," "STARTS WITH," "EQUALS," and "CONTAINS," for attributes that correspond to a text field. Examples of additional associators may include "IS LESS THAN," "IS GREATER THAN," "IS BETWEEN," "DOES NOT EQUAL," "IS EARLIER THAN," and "IS LATER THAN." In some implementations, a selected portion of an entire set of associators may be available for a particular selectable attribute. Value field 316 may be used to enter a search restriction on the associated attribute 312 within the search statement 306.

As shown in FIG. 3, the search area 302 also includes one or more "plus" icon 320 and "minus" icon 322 for adding and removing search statements. In an implementation, when the plus icon 320 is selected behind a search statement, a duplicate of that statement is displayed directly below that statement. In some implementations, the current entries for the attribute field 312 and the associator field 314 are also duplicated. In an implementation, entered search restrictions are not duplicated. Thus, a user desiring a database search according to two or more restrictions on a particular attribute may select the plus icon 320, which may cause the system to provide a new search statement having a common attribute, and may then enter a further search restriction on that common attribute in the value field of the new search statement. The user may select a new associator 314 in the new search statement, if desired. The system may automatically generate a logical OR operator to associate the search statements having common attributes, and may form an appropriate search query. The logical OR connection may be provided without the user entering any logical operators or grouping elements. As such, the search interface may be user-friendly and intuitive, and may not require user familiarity with details of Boolean logic.

As an example, a search may be performed to find all system accounts having the last name "Smith" or "Miller." Here, a user may select "Name" for a first attribute field, "IS" for the associator field, and then input "Smith" in the first value field. Next, the plus icon 320 may be selected to create a new search statement having a common attribute ("Name") by duplicating the associated search statement. The user may then input "Miller" in the value field of the newly created search statement. In this example, the search query may be formulated using the two search statements having a common attribute. The architecture 100 may automatically create an implicit logical OR operator between the two search statements upon detecting that they have a common attribute. For example, the operator may be generated when the plus icon is selected or later, such as following a selection of the "Search" control 318. The search query may be formed and a data store may be searched using the search query. Upon completing the search, the search results may include all accounts with the last name "Smith" or the last name "Miller." This may be useful, for example, if a particular user is interested in identifying all customers having last name Smith or Miller, and may facilitate retrieval of such information with a single search, rather than two separate searches.

Alternatively, when the minus icon 322 is selected, the corresponding search statement line may be removed. This may be useful, for example, if a user does not wish the requested search to include the search criteria present in a given search statement. Note that in the example implementation shown, the first search statement includes a plus icon, but not a minus icon, indicating that it may not be removed. In some implementations, the first search statement may be removed. In some implementations, the entire search area may be hidden or revealed by the selection of a "hide search fields" control 324. In general, the "plus" 320 and the "minus" 322 controls are optional, and some search statements may include zero, one, or two such controls.

In some implementations, the user may wish to add a search statement in the search area 302, but may prefer to perform the search on two or more different attributes. The architecture 100 may allow for added search statements having different attributes, or may permit a user to select another attribute than are present in previous or subsequent search statement lines. In this example, the architecture 100 (e.g., search assessment module 112) may determine that the attributes are not common, and may automatically generate and include a logical AND operator between search statements that include distinct attributes. As an example, a search may be performed to find all system accounts having the last name "Smith," and the postal code "89893." Here, a user may enter "Smith" and "89893" in separate value fields of separate search statements. The architecture 100 (e.g., operator generation module 114) may automatically create a logical AND operator to operate on the two search statements. The results may return all accounts with the last name "Smith" and the postal code "89893." This may be beneficial, for example, if a particular user is interested in all customers having last name Smith in one general location (i.e., within the area defined by postal code 89893), and may facilitate retrieval of such information with a single search, rather than two. The operator generation module 114 may also generate logical operators and grouping elements for search statements or portions thereof that are included by default in the search area 302. For example, it may be determined during system configuration that one or more particular search statements are likely to be frequently used, and those one or more search statements may be configured to initially appear in search area 302.

In general, the searches performed using architecture 100 may include multiple types of logical operators, such as both an AND operator and an OR operator, for example. The system may automatically formulate the search query to include the operators, without requiring a user to input any logical operators. In this manner, the logical operators may be implicitly added, as perceived from the user's point of view because the user may not be required to enter the operators, in one implementation.

Upon completion of one or more searches, a user may select a clear control 326 to clear the search area. In some implementations the clear control 326 may clear all search fields, as well as the search result list. The selected attributes and the number of added search statements may remain unchanged after the clear control 326 is selected, according to an implementation.

Figure 4:
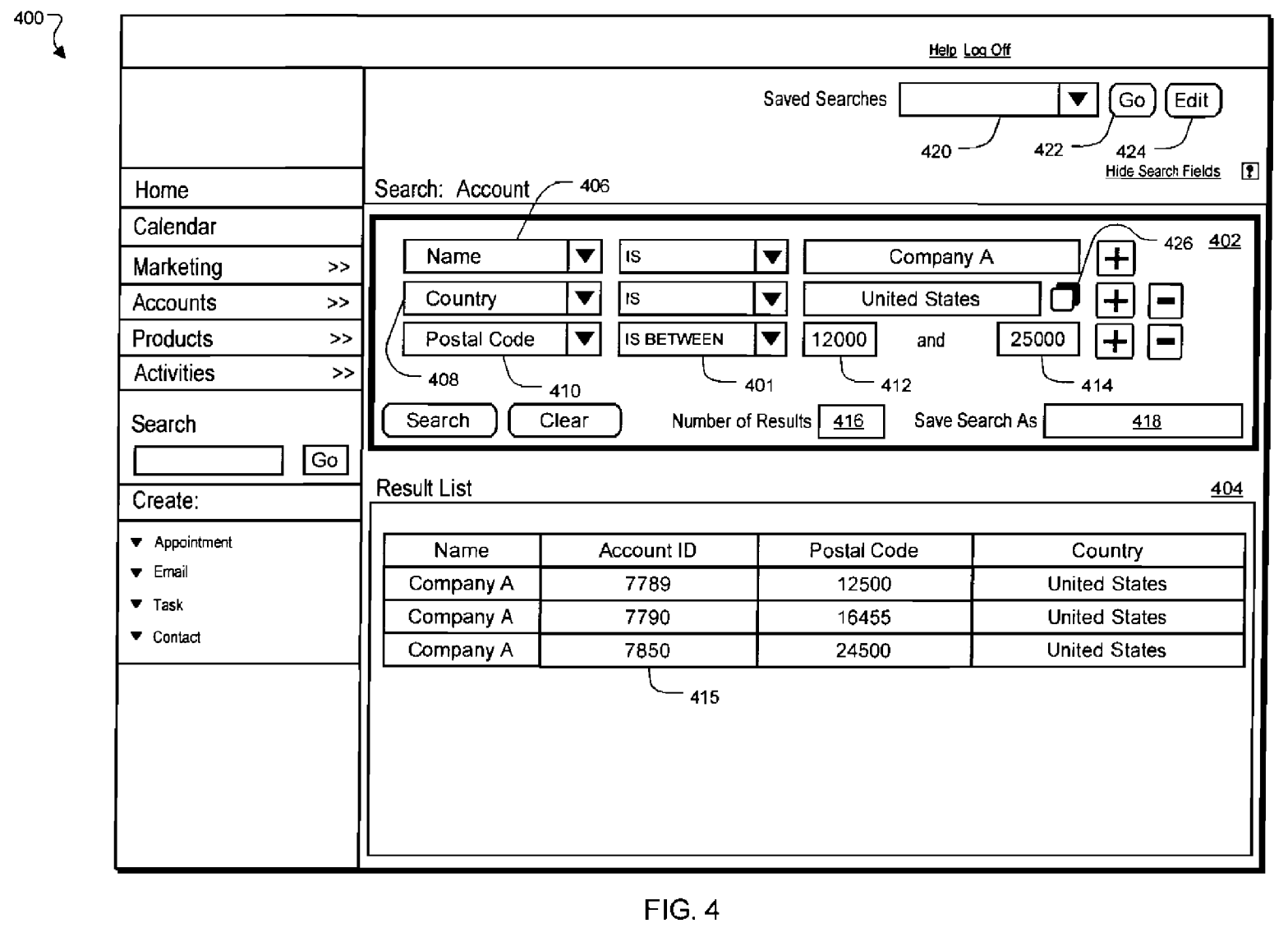

FIG. 4 is a screen shot of an exemplary user interface 400 that can be used for searching over a range of values in a single search statement. The example shown in FIG. 4 includes a search statement that may permit searching over a range of values. In particular, an "IS BETWEEN" associator 401 permits searching over a range of values with a single statement. For example, when the "IS BETWEEN" associator 401 is selected, a lower field and an upper field may be displayed in the same search statement line to allow a lower limit and an upper limit on a range of values to be entered. Displaying the two value fields within a single search statement on a single line, rather than on two or more lines, may permit a more intuitive search statement and may require fewer user operations. In addition, a reduced amount of screen space may be needed for search statements, which may free up more area for displaying search results.

The interface 400 includes a search area 402, a results display area 404, as well as various options for enhancing search result displays. Here, a user is searching for an account using three search statements, where each search statement includes a different attribute: "Name" 406, "Country" 408, and "Postal Code" 410. The user has entered criteria indicating that the search may be for an account having the name "Company A," the country "United States," and a postal code between "12000" and "25000." The architecture 100 may assess the received input using the search assessment module 112 to group the search statements accordingly, and include operators (determined in the assessment) using the operator generation module 114, as appropriate. For example, the first search statement includes the attribute "Name," the associator "IS," and the value "Company A." This search statement, if entered alone, may return all accounts with the name "Company A." However, the user here has entered further criteria to narrow the received search results. For example, the second search statement includes the attribute "Country," the associator "IS," and the value "United States." When combined with the first search statement, the search query now contains two search statements, and the architecture 100 may place an operator between the two search statements using the operator generation module 114. For example, because the two search statements operate on different attributes, the operator generation module 114 may implicitly place a logical AND operator between the two statements, such that search results having the name "Company A," and the country "United States," may be located. In addition, a third search statement has been entered that includes the attribute "Postal Code," the associator "IS BETWEEN," and two values. The two values shown indicate a lower range limit 412 (here, 12000) and an upper range limit 414 (here, 25000) for the "Postal Code" attribute 410. Because the three search statements in this example each include different attributes, the operator generation module 114 may implicitly connect the three statements using logical AND operators. Thus, the three lines may be interpreted in the architecture 100 and formulated by the query formulation module 116 into the form:

statement 1: {[<Name> IS <Company A>] AND
statement 2: [<Country> IS <United States>] AND
statement 3: [<Postal Code> IS BETWEEN [<12000> AND <25000>]]}

The search module 118 may perform the search and the presentation module 120 may present the results. The search results may include all accounts having the name "Company A," the country "United States," and a postal code between "12000" and "25000." In some implementations, the query formulation module 116 may use different syntax, rules or methods to formulate the search. As shown, the results area 404 lists three results, each having separate account identifier data 415 for distinguishing between the accounts. The results may correspond to accounts associated with three of Company A's branch locations, for example.

The interface 400 also includes various search result features. For example, a "number of results" field 416 is shown and allows for entering a number of results a user wishes to view in the results display area 404. The field 416 may be configurable by the user and may be set to capture a maximum number of results, or a number of viewable results in the current interface, for example.

Another search result feature may allow a user to save, edit, and recall search results using interface 400. The search results may be saved and recalled from one or more electronic storage devices in the enterprise resource computing system. A "Save Search As" control 418 and a "Saved Searches" control 420 may be included in the interface 400 to facilitate saving, editing, and recalling search results. The "Save Search As" control 418 includes a text box where the user may enter a file name for the search most recently performed. In some implementations, a save control (not shown) may appear upon entering the file name. In other implementations, entering the file name and a hot key, such as an enter key, may automatically save the search results. In general, if a search field of the saved search is left empty, the statement may not be included in the saved search results. For example, if an attribute has no corresponding value entered when the user attempts to save the search results, the search line content may not be saved. In other implementations, all statements may be saved.

The "Saved Searches" control 420 may include a dropdown box to select a search for retrieval. A user may select a previously saved search from the dropdown box and select a "GO" control 422 to open the search and display the result content from the prior search. As another option, the user may select an "Edit" control 424 to open the search area 402 with the same attributes and values entered as when the search was saved. Here, the user may modify attributes, associators, and values, as well as add or delete search statements before running the search query.

The user interface 400 also includes a value help icon 426. The value help icon 426 here is shown near the value field corresponding to the "Country" attribute 408. The icon 426 may be hovered-on or selected to provide a user with further information about the field. For example, the user may hover over the icon 426, as by positioning a pointing indicator over the icon 426 using a mouse, for example, to view a list of common countries selectable for the search. Value help icons may display on any, all, or none of the selectable fields in the application, and will be discussed in greater detail below. In some implementations, value help icons may be enabled and disabled as configured by the user.

Figure 5:
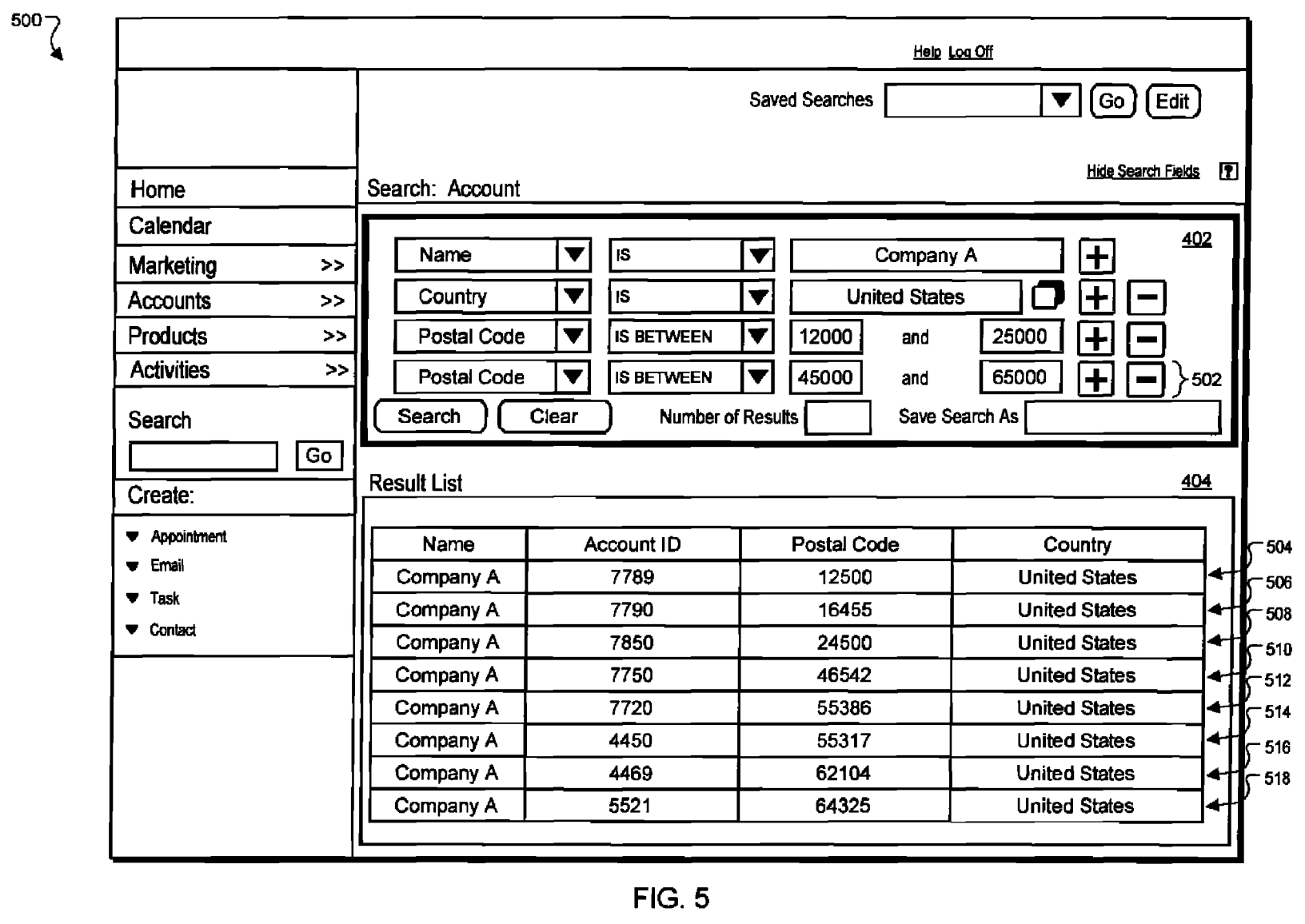

FIG. 5 is a screen shot of an exemplary user interface 500 that can be used for searching over multiple ranges of values. In particular, the interface 500 may assess search statements and automatically combine one or more of the statements having common or similar attributes with a logical OR operator without requiring a user to provide the logical operator or an indication thereof, or the associated grouping operators or elements that operate on the search criteria and the logical operators. In addition, statements having different attributes may be combined with other statements using a logical AND operator in a similar fashion. Similar to FIG. 4, the user interface 500 also includes the search area 402 and the result display area 404. As shown in FIG. 5, four search statements are currently present in the search area 402; the first three statements have distinct attributes, while the fourth statement includes a common attribute ("Postal Code") to that of the third statement. Thus, for the four search statements currently shown in FIG. 5, two of the statements have a common attribute and the other two statements include distinct attributes from each other and from the statements that share a common attribute. As such, when the system analyzes the search statement, three groups may be formed, with one group including two statements and two groups including single statements.

In this example, a user has selected a plus icon on the "Postal Code" search statement (410), shown in FIG. 4. Upon selection of the plus icon, a second search statement 502 is generated and in this example, includes the same attribute type as the previous statement. When the search statement is duplicated, the architecture 100 may also implicitly generate logical operators to link the statements together. As described above with respect to FIG. 4, the user may be searching for a particular account having specific attributes. In this example, the user has entered a first range and duplicated the last search statement in FIG. 4 to produce a new search statement 502 in FIG. 5 having range value boxes where the user may input a second range of values. As shown in FIG. 5, the user has currently entered a new range in search statement 502. The user may be searching for an account with a postal code between a first lower limit (here, 12000) and a first upper limit (here, 25000), as well as between a second lower limit (here, 45000) and a second upper limit (here, 65000). That is, the user may be searching for an account having a postal code either between 12000 and 25000 or between 45000 and 65000. Since the two search statements are defined to operate on the same attribute, the operator generation module 114 shown in FIG. 1 may implicitly connect the two search statements using a logical OR operator. Similarly, the operator generation module 114 may implicitly connect the other two search statements (i.e., the statements having attributes "Name," and "Country") with the group of logically OR-combined statements using a logical AND operator since the other statements in the search area operate on different attributes. Thus, the four lines may be interpreted in the architecture 100 and formulated by the query formulation module 116 into the example form:

statement 1: {[<Name>IS<Company A>] AND
statement 2: [<Country>IS<United States>] AND
statement 3: {[<Postal Code>IS BETWEEN [<12000>AND <25000>]] OR
statement 4: [<Postal Code>IS BETWEEN [<45000>AND <65000>]]}}

The search module 118 may perform the search and the presentation module 120 may present the results. The search results may include all accounts having the name "Company A," the country "United States," and a postal code between "12000" and "25000" or a postal code between "45000" and "65000." As shown in the result display area 404, the search results currently include accounts 504, 506, and 508 that have the name "Company A," the Country "United States," and the postal code between "12000" and "25000." These results 504, 506, and 508 were identified as a result of the incorporation of the search statement with postal code range 12000 to 25000 into the search query. The result display area 404 also currently includes results 510, 512, 514, 516, and 518 that were identified as a result of the incorporation of the search statement with postal code range 45000 to 65000 into the search query.

The search statements may generally be grouped according to the associated attribute, and the logical operators may be added according to how the search statements are grouped. For example, the selected postal code attribute in the example described above permits the statements that include the postal code attribute to be grouped together using a logical OR operator to produce results including both a first and second range of postal code values. The entry of the search criteria may require less time and effort, including fewer input operations, by the user as the grouping may be automatically performed by the architecture 100. In some implementations, the manner in which elements are grouped and the placement of the logical operators may not be shown to the user, so as to minimize the opportunity for confusion with the search entry process. In an implementation, the user may not submit input specifying grouping and logical operators. Instead, the search assessment module 112 may analyze the entered statements and automatically group statements that have common attributes together. The operator generation module 114 may then generate the appropriate operators and the search query may be formulated. For example, for groups that include more than one search statement having a common attribute, those more than one search statements may be associated with one another using logical OR operators. As such, a group consisting of logically OR associated statements may be formed. Then, logical AND operators may be used to associate each of the groups, and the single-statement groups. In addition to grouping similar attributes, the architecture 100 may group combined search attributes in a single search statement.

Figure 6:
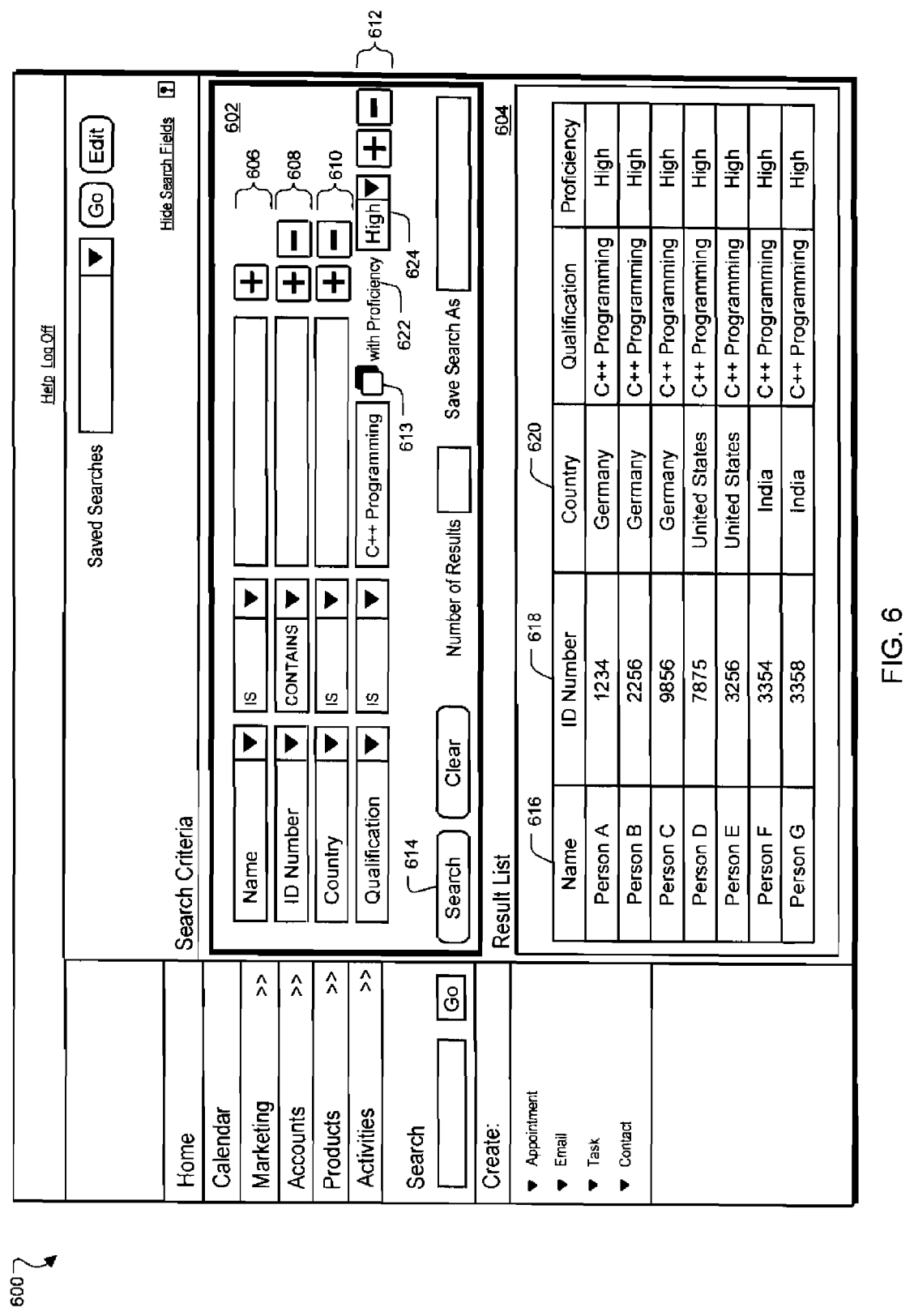

FIG. 6 is a screen shot of an exemplary user interface 600 that can be used for searching with combined search attributes. The user interface 600 is similar to the interfaces shown in FIGS. 2-5 above, and includes a search area 602 and a result display area 604. The search area 602 currently includes four search statements 606, 608, 610, 612 that allow a user to enter search criteria. In some implementations, the search statements shown in interface 600 may be considered the four most common search fields used in the application, and may be provided by the system by default. In other implementations, the search statements shown by default may be user configurable. The search statements shown in FIG. 6 include a "Name" attribute in the first statement 606, an "ID Number" attribute in the second statement 608, a "Country" attribute in the third statement 610, and a "Qualification" attribute in the fourth statement 612. The search area 602 shown in this example does not include parameters in the "Name" value field, the "ID Number" value field, or the "Country" value field. As such, in this example, a restriction may not be placed on the corresponding attributes when a search is performed. For example, results may be returned to the user having varying names, ID numbers, and countries.

The user interface 600 of FIG. 6 shows one implementation of searching with combined search attributes, and any number of methods may be appropriate for combining the attributes. For example, a combined search may combine two attributes and two values in a single search statement. In general, constructing a search statement may include selecting a first attribute, selecting an associator, and entering one or more values, as shown in the above examples. In some implementations, a second optional, dependent attribute and value may be entered with the first attribute and value within the same search statement. The fourth search statement 612 shows an example of a combined search attribute that includes a first attribute and a dependent attribute. The dependent attribute may depend on the first attribute for context, or to supply meaning. In some implementations, two or more dependent attributes may be included in one search line. For example, a search statement may include a first attribute and one, two, three, four, five, or more dependent attributes, which may each also include one or more associated attribute values. The dependent attribute and value may pertain to the information in the first attribute.

For example, a user may wish to search for an individual having the ability to program in the programming language C++ with high proficiency. The user may enter the search criteria as shown in search statement 612 in FIG. 6. Here, the user has entered a first attribute "Qualification," an associator "IS," and a value "C++ Programming." Next, the user may enter a dependent second attribute "Proficiency" 622, as well as an associated second field value "High" 624. The "Proficiency" attribute 622 is a shown here as a dependent attribute to the "Qualification" attribute. The "with" operator in "with Proficiency," as the dependent attribute is shown, emphasizes this dependency. In other words, the "with Proficiency" attribute may generally display in conjunction with a leading attribute, such as the "Qualification" attribute. In some implementations, the "with" operator may be included to make the search statement more readable from the user's point of view. In formulating combined search statements, the system may include a logical AND operator between the two search statement attribute/value pairs. In this example, the user desires to identify the individual(s) meeting the criteria Qualification/C++ Programming AND Proficiency/High. The system may implicitly include the AND operator, and this may be done in transparent fashion from the user's perspective, which may advantageously relieve the user of the burden of understanding Boolean logic. The architecture 100 may further implicitly includes an "IS" associator between a dependent attribute and its associated value field (here, between "Proficiency" and "High"). Thus, the search statement may be interpreted in the architecture 100 and formulated by the query formulation module 116 into the form:

<Qualification> IS <C++ Programming> AND <Proficiency> IS <High>

Combined search statements may provide the advantage of being more intuitive and easier to use for a user. Combined search statements that include dependent attributes may be advantageous because the dependency may be clearly shown on a single search line, rather than on two search lines, making it easier to recognize the dependency. This may consume less display space, which may leave more display space available for search results. In some implementations, the value "C++ Programming" may be selected from a value help menu available through an icon 613. The value help menu may include several selectable values dependent on the attribute selected. In this example, the value help menu may include various other skills qualifications a user may possess. This may provide a convenient way for a user to select a desired value from among a list or table of values or options.

After the search statement is formulated, the user may select a search control 614 to run the search query. Results from the search query may be displayed in the search result area 604. As shown, the result area 604 currently includes individuals (here, Persons A-G) qualified to program in C++ with high proficiency. As described above, restrictions may not have been placed on attributes with empty value fields. Thus, the search results display a varying list of Names 616, ID Numbers 618, and Countries 620 because the user left the value fields empty for each of these attributes.

FIG. 7 is a screen shot of an exemplary user interface 660 that can be used for searching with a combined search statement. As previously described, combined search statements may include more than one attribute and associated attribute values within a single search statement. In an implementation, a search statement may include a leading attribute and one or more leading attribute values, along with one or more dependent attributes and one or more dependent attribute values. The search statement may be presented within a single line in the search area.

For example, suppose that an engineering manager of a large corporation desires a list of all employees who can write software using the C++ programming language and can do so at a high-proficiency level. Suppose further that the manager particularly is interested in such employees who can also write software using the Java programming language and can do so at least at a medium-proficiency level. The example interface 660 of FIG. 7 includes a search area 662 with two search statements 667, 668. A first search statement 667, when formulated into a search query, will serve to identify programmers. A combined search statement 668 includes a leading attribute 669, two associated values for the leading attribute, and two dependent attributes and two associated values. The combined search statement 668 includes a "Qualification" leading attribute 669, an "IS" associator, a multivalue box 672, the population of which will be discussed below, and a value help icon 670 that can be selected or accessed for help in entering search criteria. When the user selects the value help icon 670, a table 671 may be displayed. For example, the table 671 may be displayed in a popup window 664. The window 664 is shown near the bottom of the interface 660 in FIG. 7, but may be presented elsewhere in the interface 660. In some implementations, the value help table 671 and a search result list may be displayed concurrently in the interface 660. For simplicity, the search result list is not shown in FIG. 7. The table 671 may include attributes and values that can be used to specify a search statement. In an implementation, one or more of the attributes may be dependent attributes. In this example, the table 671 includes a label 673 that identifies the leading attribute ("Qualification") 669 in the associated search statement 668. A first column of the table includes a heading 674, "Language" in this example, that identifies values that may be selected to associate with the leading attribute 669 in the statement 668. Specifically, a user may select any of several programming languages from the first column of the table. These selected languages may be associated values for the leading attribute 669 in the search statement 668. The second and third columns of the table include dependent attributes and associated values. A "Proficiency" label 675 of the second column indicates that proficiency may be a dependent attribute associated with the leading attribute 669, and an "Efficiency" label 676 of the third column indicates that efficiency may similarly be a dependent attribute associated with the leading attribute 669. As such, a user may restrict a search according to either proficiency, efficiency, both, or neither in this example. Below each dependent attribute label 675, 676, associated dependent attribute values are presented, and may be selected for association with the dependent attribute.

Continuing with this example, the user may select a "C++" attribute value 677 in the table 671 under the "Language" heading 674, indicating that C++ is a qualification of interest. Next, the user may select a "High" attribute value 678 under the "Proficiency" attribute 675 to indicate that the user is interested in identifying persons able to program in C++ with high proficiency. The system may present a first entry 665 in the multivalue box 672 of the combined search statement 668 to identify these selections. In similar fashion, the user may select a "Java" attribute value 680 and a "Medium" attribute value 681 under the "Proficiency" attribute 675 to indicate that the user is interested in identifying persons able to program in Java with medium proficiency. A second entry 682 may by presented in the multivalue box 672 to identify these selections. The system may automatically generate logical AND operators to associate entries 665, 682 in a multivalue box 672. The system may then formulate a search query designed to identify programmers qualified to program both in C++ with high proficiency and in Java with medium proficiency, and results may be presented. Thus, within a single search statement, a user may specify complex search criteria in an efficient and user-friendly manner.

In another example, the user may additionally limit the search by selecting additional attributes and values, including additional dependent attributes and values. For instance, following the selection of the proficiency value associated with C++ programming, the user may select an "Adequate" value under the "Efficiency" attribute in the table 671. In this case, the multivalue box 672 would contain an entry reading: "C++ Programming with Proficiency High with Efficiency Adequate," and the search would further restrict the identification of high-proficiency, C++ programmers to those of at least adequate efficiency level. Thus, the value help icon 670 and associated table 671 may facilitate an intuitive and easily comprehensible method of specifying complex search criteria.

Figure 8:
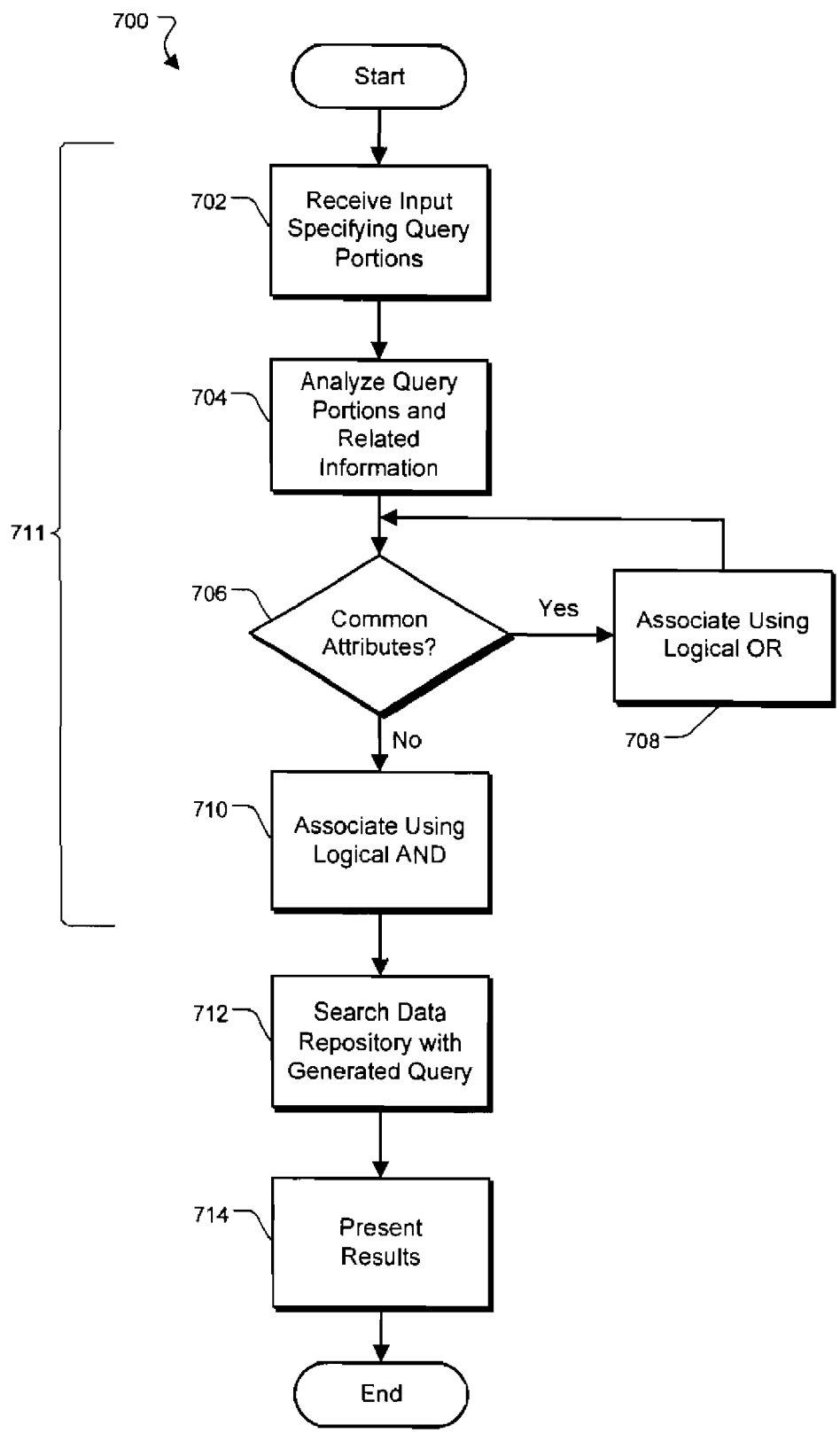
FIG. 8 is a flow chart of exemplary operations that can be performed to obtain a query and search a data repository.

FIG. 8 is a flow chart 700 of exemplary operations that can be performed to obtain a query and search a data repository. The operations 700 can be performed by a processor executing instructions stored in a computer program product. The operations 700 begin in step 702 with receiving a query-type input that a user makes under the guidance of a graphical user interface. For example, the system shown in FIG. 1 may receive query portions or search statements in an enterprise resource computing application designed for searching data repositories. The search statement may include values that pertain to attributes available in the application. For example, the search statement may include a particular "company" that is tied to a "name" attribute in the application.

In step 704, the operations comprise analyzing the received input, including assessing individual search statements. For example, the analysis may be performed by the search assessment module 112 shown in FIG. 1 to determine how to group a search statement, or additionally, how to assign one or more logical operators between the search statements. In one implementation, the operations 700 may first determine how to group statements having common attributes and next determine how to group statements having different attributes. In step 706, the operations 700 may comprise determining whether or not one or more statements share a common attribute. For example, the example shown in FIG. 5 includes two search statements with the common attribute ("Postal Code"). If the operations 700 determine that one or more search statements share a common attribute, the statements having the common attribute may be associated using a logical OR operator (708). Then, the operations 700 may comprise returning to analyze further query portions. However, if the operations 700 determine that two statements do not share a common attribute, the statements may comprise associating the statements using a logical AND operator, in step 710.

As an example, consider four attributes (e.g., A, B, C, and D), where each attribute may assume various values. Suppose that a user enters several query portions using various combinations of the four attributes, and enters desired search values as well. The architecture 100 may receive this input. In this example, let a single prime mark (e.g., A'), a double prime mark (e.g., A"), or a lack of any prime mark (e.g., A) indicate a different value for a particular attribute. The received input in this example may be A, B, B', C, D, D', D", which may indicate that a user desires a search having single search statements that include attributes A and C; two search statements, each with different values, for common attribute B; and three search statements, each with different values, for common attribute D. As such, when the system receives the search statements, the search assessment module 112 may determine whether there are common attributes shared between the search statements. Then, the operator generation module 114 shown in FIG. 1 may generate operators to associate the search statements. Here, the B and B' statements have common attributes, and the D, D', and D" statements have common attributes. As such, the system may associate the B and B' statements with a logical OR operator, and may similarly associate the D, D', and D" statements with logical OR operators. The architecture 100 may formulate a search query from the attributes above using the query formulation module 116 shown in FIG. 1, for example. The query formulation module 116 may perform a query formulation process 711 (e.g., steps 702-710), which may be executed by one or more processors in the architecture 100. The process 711 may receive input and perform an analysis to associate search statements sharing common attributes with the logical OR operator and associate search statements having different attributes with the logical AND operator. As an example, the system may interpret the search statements described above in the following format:

{<A> AND [<B> OR <B'>] AND <C> AND [<D> OR <D'> OR <D">]}

In some implementations, the system may interpret the search query in the following format:

{<A> * [<B> + <B'>] * <C> * [ <D> + <D'> + <D">]}

After grouping the search statements, the operations 700 may comprise performing the search query using the grouped search statements, in step 712. For example, the search module shown in FIG. 1 may perform the search query using the formulated statements in the appropriate query format. If the search query produces search results, the search results may be presented to the user, in step 714. In some implementations, the search query may not produce search results. As such, the user may be presented a blank screen, or feedback regarding entering more information in the search statements.

Figure 9:
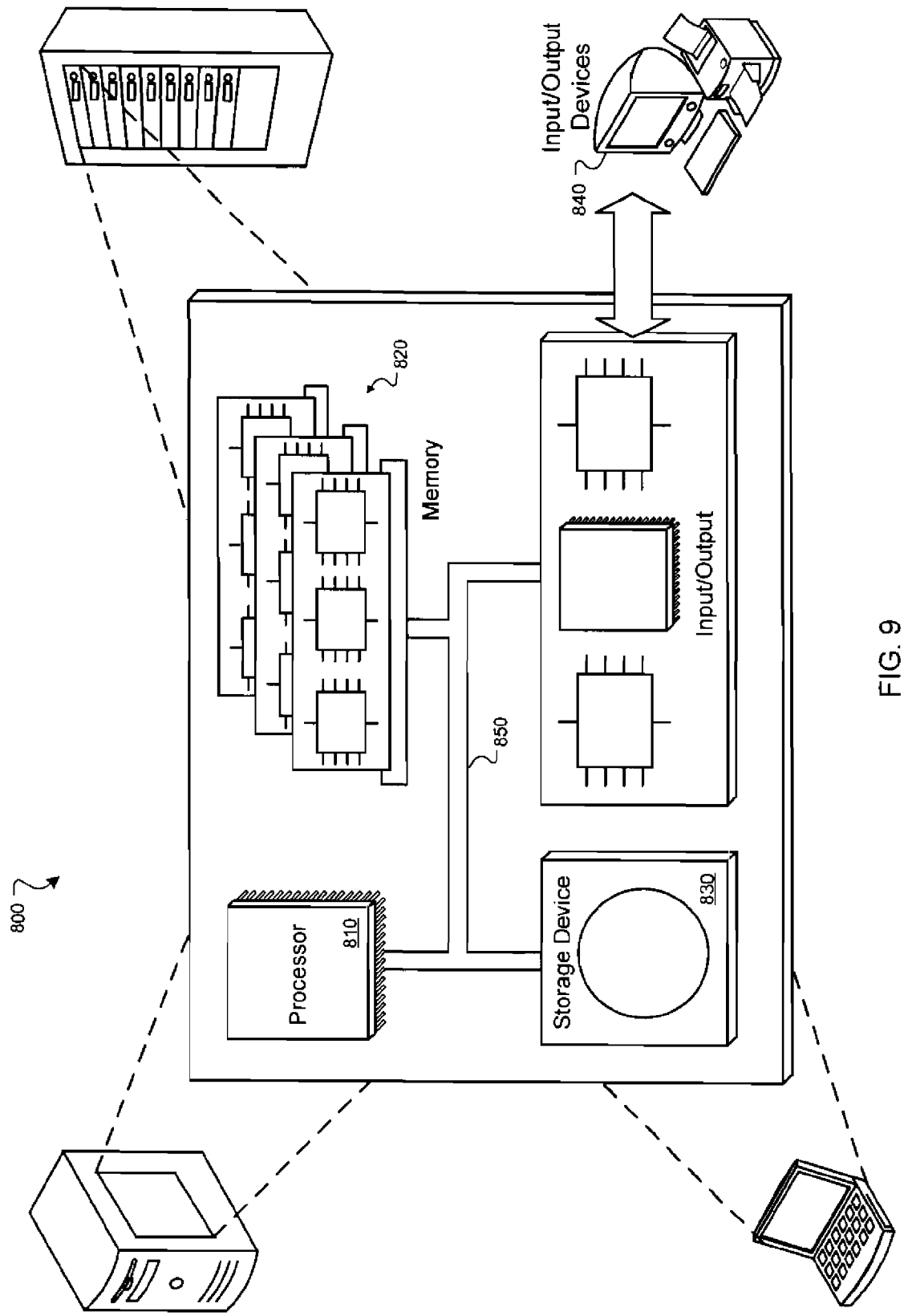
FIG. 9 is a block diagram of a computing system that can be used in connection with computer-implemented methods described in this document.

FIG. 9 is a schematic diagram of a generic computer system 800. The system 800 can be used for the operations described in association with any of the computer-implement methods described previously, according to one implementation. The system 800 includes a processor 810, a memory 820, a storage device 830, and an input/output device 840. Each of the components 810, 820, 830, and 840 are interconnected using a system bus 850. The processor 810 is capable of processing instructions for execution within the system 800. In one implementation, the processor 810 is a single-threaded processor. In another implementation, the processor 810 is a multi-threaded processor. The processor 810 is capable of processing instructions stored in the memory 820 or on the storage device 830 to display graphical information for a user interface on the input/output device 840.

The memory 820 stores information within the system 800. In one implementation, the memory 820 is a computer-readable medium. In one implementation, the memory 820 is a volatile memory unit. In another implementation, the memory 820 is a non-volatile memory unit.

The storage device 830 is capable of providing mass storage for the system 800. In one implementation, the storage device 830 is a computer-readable medium. In various different implementations, the storage device 830 may be a floppy disk device, a hard disk device, an optical disk device, or a tape device.

The input/output device 840 provides input/output operations for the system 800. In one implementation, the input/output device 840 includes a keyboard and/or pointing device. In another implementation, the input/output device 840 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. Accordingly, other embodiments are within the scope of the following claims.

What is claimed is:

1. A computer-implemented method of performing a search to identify documents within an electronic data repository that are relevant to a search query, the method comprising:

receiving an electronic input initiated by a user under guidance of a graphical computer user interface, the electronic input specifying a plurality of user-entered query portions to be used in performing a search to identify documents that are related to the plurality of user-entered query portions within an electronic data repository in an enterprise resource computing system, each of the query portions comprising a preconfigured attribute and an associated value for the preconfigured attribute entered by the user, the preconfigured attribute corresponding to one of several preconfigured attributes of objects in the data repository, wherein the electronic input does not specify a logical operator between any of the query portions;

generating a search query for searching the data repository, the search query being generated by:
(i) determining whether two or more of the query portions each have a common preconfigured attribute, and associating any such query portions having the common preconfigured attribute with each other into a new query portion using a logical OR operator, wherein the new query portion comprises a logical sum of the query portions having the common preconfigured attribute; and
(ii) thereafter associating any of the query portions that were not associated in step (i), and any new query portion formed in step (i), with each other using a logical AND operator, wherein the generated search query comprises a logical product of the query portions that were not associated in step (i) and any new query portions formed in step (i); and searching the data repository with the generated search query and presenting results comprising an identification of documents within the data repository that are responsive to the generated query, wherein the graphical computer user interface does not provide for user selection of the logical OR operator or the logical AND operator to be used in generating the search query.

2. The computer-implemented method of claim 1, wherein each of the query portions individually comprise a single search statement, and wherein each search statement is displayed on a single line in the graphical user interface.

3. The computer-implemented method of claim 1, wherein the graphical computer user interface does not display the logical OR operator, and does not provide for user selection of logical operators.

4. The computer-implemented method of claim 1, wherein the graphical computer user interface does not display the logical AND operator, and does not provide for user selection of logical operators.

5. The computer-implemented method of claim 1, further comprising logically isolating the query portions having a common preconfigured attribute with grouping elements to form the new query portion, wherein the graphical computer user interface does not display the grouping elements for operating on received query portions.

6. The computer-implemented method of claim 1, further comprising receiving a query portion that specifies a range of values, the range comprising a lower range limit and an upper range limit, wherein the query portion comprises a single search statement that is displayed on a single line in the graphical computer user interface.

7. The computer-implemented method of claim 6, wherein the search query is generated using at least two query portions that each specify a range of values, the at least two query portions having a common preconfigured attribute and associated using a logical OR operator.

8. The computer-implemented method of claim 1, wherein at least one of the query portions comprises at least two preconfigured attributes and associated values for the at least two preconfigured attributes entered by the user, the at least two preconfigured attributes and associated values comprising a single search statement that is displayed on a single line in the graphical user interface.

9. A computer program product tangibly embodied in a computer-readable storage medium and comprising instructions that when executed by a processor perform a method for performing a search to identify documents within an electronic data repository that are relevant to a search query, the method comprising:

receive an electronic input initiated by a user under guidance of a graphical computer user interface, the electronic input specifying a plurality of user-entered query portions to be used in performing a search to identify documents that are related to the plurality of user-entered query portions within an electronic data repository in an enterprise resource computing system, each of the query portions comprising a preconfigured attribute and an associated value for the preconfigured attribute entered by the user, the preconfigured attribute corresponding to one of several preconfigured attributes of objects in the data repository, wherein the electronic input does not specify a logical operator between any of the query portions;

generate a search query for searching the data repository, the search query being generated by:
(i) determining whether two or more of the query portions each have a common preconfigured attribute, and associating any such query portions having the common preconfigured attribute with each other into a new query portion using a logical OR operator, wherein the new query portion comprises a logical sum of the query portions having the common preconfigured attribute; and
(ii) thereafter associating any of the query portions that were not associated in step (i), and any new query portion formed in step (i), with each other using a logical AND operator, wherein the generated search query comprises a logical product of the query portions that were not associated in step (i) and any new query portions formed in step (i); and search the data repository with the generated search query and present results comprising an identification of documents within the data repository that are responsive to the generated query, wherein the graphical computer user interface does not provide for user selection of the logical OR operator or the logical AND operator to be used in generating the search query.

10. The computer program product of claim 9, wherein each of the query portions individually comprise a single search statement, and wherein each search statement is displayed on a single line in the graphical user interface.

11. The computer program product of claim 9, wherein the graphical computer user interface does not display the logical OR operator, does not display the logical AND operator, and does not provide for user selection of logical operators.

12. The computer program product of claim 9, further comprising instructions that when executed logically isolate the query portions having a common preconfigured attribute with grouping elements to form the new query portion, wherein the graphical computer user interface does not display the grouping elements for operating on received query portions.

13. The computer program product of claim 9, further comprising instructions that when executed receive a query portion that specifies a range of values, the range comprising a lower range limit and an upper range limit, wherein the query portion comprises a single search statement that is displayed on a single line in the graphical computer user interface.

14. The computer program product of claim 13, wherein the search query is generated using at least two query portions that each specify a range of values, the at least two query portions having a common preconfigured attribute and associated using a logical OR operator.

15. The computer program product of claim 9, wherein at least one of the query portions comprises at least two preconfigured attributes and associated values for the at least two preconfigured attributes entered by the user, the at least two preconfigured attributes and associated values comprising a single search statement that is displayed on a single line in the graphical user interface.

16. A computer program product tangibly embodied in a computer-readable storage medium, the computer program product including instructions that, when executed, generate on a display device a graphical user interface for obtaining a query for searching a data repository, the graphical user interface comprising:
- at least three search statements capable of receiving user input comprising query portions to be used in searching a data repository in an enterprise resource computing system, each of the query portions comprising a preconfigured attribute and an associated value for the preconfigured attribute entered by the user, the preconfigured attribute corresponding to one of several preconfigured attributes of objects in the data repository, wherein the input does not specify a logical operator between any of the query portions, and wherein a search query for searching the data repository is generated by:
  - (i) determining whether two or more of the query portions each have a common preconfigured attribute, and associating any such query portions having the common preconfigured attribute with each other into a new query portion using a logical OR operator, wherein the new query portion comprises a logical sum of the query portions having the common preconfigured attribute; and
  - (ii) thereafter associating any of the query portions that were not associated in step (i), and any new query portion formed in step (i), with each other using a logical AND operator, wherein the generated search query comprises a logical product of the query portions that were not associated in step (i) and any new query portions formed in step (i);
- wherein the search query is generated by associating at least two query portions with a logical OR operator and by associating at least two query portions with a logical AND operator, wherein the graphical user interface does not provide for user selection of the logical OR operator or the logical AND operator to be used in generating the search query.

17. The computer-implemented method of claim 1, wherein determining whether two or more of the query portions each have a common preconfigured attribute comprises determining whether the query portions specify distinct values for instances of a same preconfigured attribute.

18. The computer-implemented method of claim 1, wherein determining whether two or more of the query portions each have a common preconfigured attribute comprises determining whether the query portions specify distinct search restrictions for a same preconfigured attribute.

* * * * *